US007863856B2

(12) United States Patent
Sherman et al.

(10) Patent No.: US 7,863,856 B2
(45) Date of Patent: Jan. 4, 2011

(54) BI-DIRECTIONAL BATTERY CHARGING FOR COUPLED ELECTRONIC DEVICES

(75) Inventors: Itay Sherman, Hod Hasharon (IL); Tamr Demri, Herzilya (IL)

(73) Assignee: Modu Ltd., Kfar Saba (IL)

( * ) Notice: Subject to any disclaimer, the term of this patent is extended or adjusted under 35 U.S.C. 154(b) by 582 days.

(21) Appl. No.: 12/008,499

(22) Filed: Jan. 11, 2008

(65) Prior Publication Data
US 2009/0179612 A1    Jul. 16, 2009

(51) Int. Cl.
H02J 7/00    (2006.01)
(52) U.S. Cl. .................................................. 320/103
(58) Field of Classification Search .................. 320/103
See application file for complete search history.

(56) References Cited

U.S. PATENT DOCUMENTS

| | | |
|---|---|---|
| 5,625,673 A | 4/1997 | Grewe et al. |
| 5,628,055 A | 5/1997 | Stein |
| 5,809,115 A | 9/1998 | Inkinen |
| 5,893,037 A | 4/1999 | Reele et al. |
| 5,907,815 A | 5/1999 | Grimm et al. |
| 6,188,917 B1 | 2/2001 | Laureanti |
| 6,201,867 B1 | 3/2001 | Koike |
| 6,243,578 B1 | 6/2001 | Koike |
| 6,477,357 B1 | 11/2002 | Cook |
| 6,516,202 B1 | 2/2003 | Hawkins et al. |
| 6,640,113 B1 | 10/2003 | Shim et al. |
| 6,690,947 B1 | 2/2004 | Tom |
| 6,898,283 B2 | 5/2005 | Wycherley et al. |
| 6,907,264 B1 | 6/2005 | Sterkel |
| 6,999,792 B2 | 2/2006 | Warren |
| 7,085,542 B2 | 8/2006 | Dietrich et al. |
| 7,194,285 B2 | 3/2007 | Tom |
| 7,266,391 B2 | 9/2007 | Warren |
| 7,508,162 B2 * | 3/2009 | Lippojoki et al. ........... 320/103 |
| 7,791,311 B2 * | 9/2010 | Sagoo ......................... 320/108 |

(Continued)

FOREIGN PATENT DOCUMENTS

EP    1871075 A1    12/2007

(Continued)

Primary Examiner—Edward Tso
Assistant Examiner—M'Baye Diao
(74) Attorney, Agent, or Firm—Soquel Group LLC

(57) ABSTRACT

A system for bi-directional battery charging, including a first electronic device, including a first rechargeable battery, for providing power to the first electronic device, and a first battery charger, and a second electronic device, including a second rechargeable battery, for providing power to the second electronic device, a second battery charger, a voltage boost that receives an input voltage from the first rechargeable battery and is selectively enabled to either up-convert the input voltage as input to the second battery charger, or else to passively pass the input voltage to the second battery charger; and a controller for programmatically controlling the first and the second battery chargers and the voltage boost, wherein the second electronic device attaches to the first electronic device to operate in combination therewith, and wherein the controller is programmed to decide, based on the voltages of the first and the second rechargeable batteries: (i) whether to supply power to the second electronic device from the first or second rechargeable battery, (ii) whether to charge the second rechargeable battery from the first rechargeable battery, and (iii) whether to enable or disable the voltage boost. A method is also described and claimed.

13 Claims, 12 Drawing Sheets

U.S. PATENT DOCUMENTS

| | | |
|---|---|---|
| 2002/0090980 A1 | 7/2002 | Wilcox et al. |
| 2002/0151327 A1 | 10/2002 | Levitt |
| 2004/0233930 A1 | 11/2004 | Colby, Jr. |
| 2004/0268005 A1 | 12/2004 | Dickie |
| 2005/0070225 A1 | 3/2005 | Lee |
| 2005/0159184 A1 | 7/2005 | Kerner et al. |
| 2006/0003804 A1 | 1/2006 | Liu |
| 2006/0105722 A1 | 5/2006 | Kumar |
| 2006/0241353 A1 | 10/2006 | Makino et al. |
| 2007/0004450 A1 | 1/2007 | Parikh |
| 2007/0018957 A1 | 1/2007 | Seo |
| 2007/0079030 A1 | 4/2007 | Okuley et al. |
| 2007/0161404 A1 | 7/2007 | Yasujima et al. |
| 2007/0288583 A1 | 12/2007 | Rensin et al. |
| 2008/0009325 A1 | 1/2008 | Zinn et al. |
| 2008/0026794 A1 | 1/2008 | Warren |
| 2008/0040354 A1 | 2/2008 | Ray et al. |
| 2008/0140886 A1 | 6/2008 | Izutsu |
| 2008/0284370 A1 * | 11/2008 | Manor et al. ............... 320/103 |

FOREIGN PATENT DOCUMENTS

| | | |
|---|---|---|
| WO | 9421058 A1 | 9/1994 |
| WO | 0059247 A1 | 10/2000 |
| WO | 0186922 A1 | 11/2001 |
| WO | 03103174 A1 | 12/2003 |

* cited by examiner

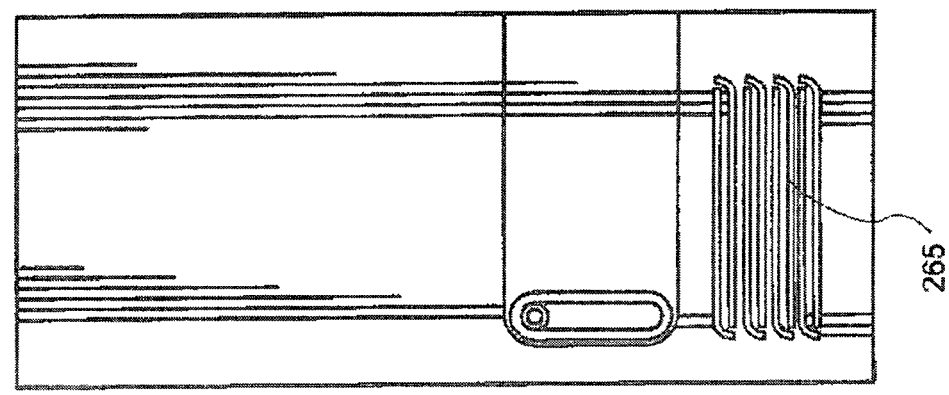
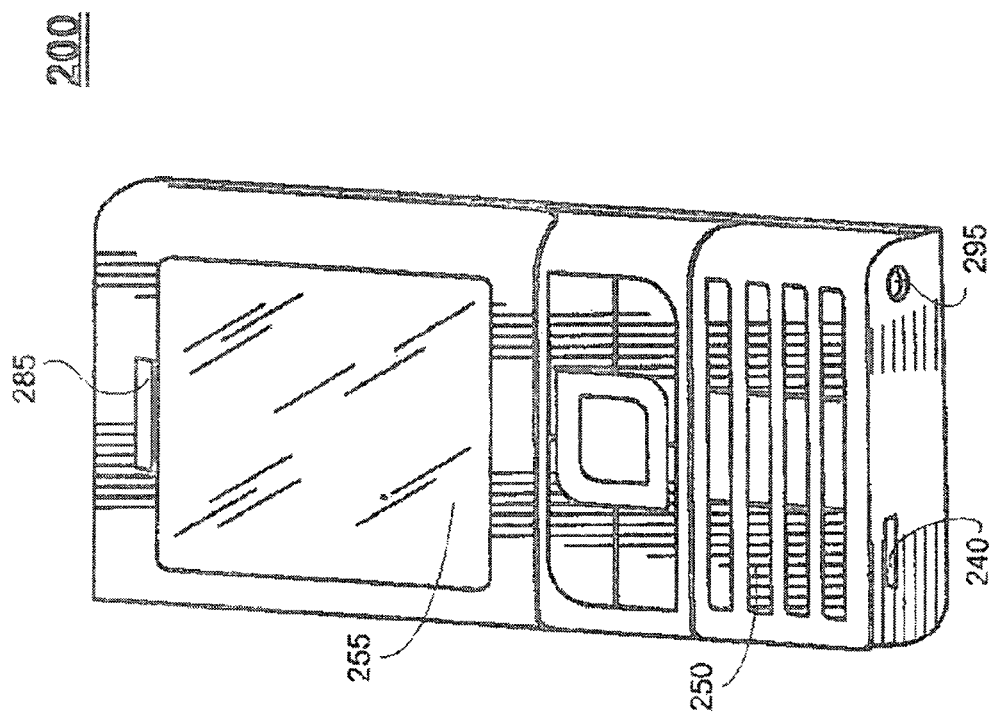
FIG. 3

| SA Battery State | JKT Battery State | SA Mode | SA Charging Mode | SA Boost | SA Charger |
|---|---|---|---|---|---|
| SA>Vh | JKT>SA | Standby | Supply from JKT Battery | Disabled | Fixed voltage = SA |
| | | High | Supply from SA and JKT Battery | Disabled | Fixed current = STBC |
| | JKT<SA | All | No Charge | Disabled | No charge |
| V1<SA<Vh | JKT>SA+Vc | All | Charge from JKT Battery | Disabled | Fixed current = CC |
| | SA<JKT<SA+Vc | Standby | Supply from JKT Battery | Disabled | Fixed voltage = SA |
| | | High | Supply from SA and JKT Battery | Disabled | Fixed current = STBC |
| | JKT<SA | Standby | Supply from JKT Battery | Enabled | Fixed voltage = SA |
| | | High | Supply from SA and JKT Battery | Enabled | Fixed current = STBC |
| SA<V1 | JKT>SA+Vc | All | Charge from JKT Battery | Disabled | Fixed current = CC |
| | JKT<SA+Vc | All | Charge from JKT Battery | Enabled | Fixed current = CC |

FIG. 10

| SA Battery State | HST Battery State | SA Mode | Charging Mode | SA Boost | SA Charger | HST Charger & Boost |
|---|---|---|---|---|---|---|
| SA>Vh | HST>SA | Standby | Supply from HST Battery | Disabled | Fixed voltage = SA | Disabled |
| | | High | Supply from SA and HST Battery | Disabled | Fixed current = STBC | Disabled |
| | Vm<HST<SA | All | No Charge | Disabled | No charge | Disabled |
| | HST<Vm | All | Charge from SA Battery | Disabled | No charge | Enabled |
| V1<SA<Vh | HST>SA+Vc | All | Charge from HST Battery | Disabled | Fixed current = CC | Disabled |
| | SA<HST<SA+Vc | Standby | Supply from HST Battery | Disabled | Fixed voltage = SA | Disabled |
| | | High | Supply from SA and HST Battery | Disabled | Fixed current = STBC | Disabled |
| | Vm<HST<SA | All | No Charge | Disabled | No charge | Disabled |
| | HST<Vm | All | Charge from SA Battery | Disabled | No charge | Enabled |
| SA<V1 | HST>SA+Vc | All | Charge from HST Battery | Disabled | Fixed current = CC | Disabled |
| | Vm<HST<SA+Vc | All | Charge from HST Battery | Enabled | Fixed current = CC | Disabled |
| | HST<Vm | All | No charge | Disabled | No charge | Disabled |

FIG. 12

BI-DIRECTIONAL BATTERY CHARGING FOR COUPLED ELECTRONIC DEVICES

FIELD OF THE INVENTION

The field of the present invention is management of battery power supply and battery charging for electronic devices.

SUMMARY OF THE DESCRIPTION

Aspects of the present invention relate to battery supply and battery charging of coupled electronic devices. One or both of the electronic devices operates in a standalone mode, and the devices also operate in a coupled mode when one is attached to the other. Each device has its own rechargeable battery and internal battery charger, and the coupling enables the battery of one device to supply power to the other device, and to charge the other device's battery. Using the present invention, optimized logic for controlling power supply and battery charging of the coupled devices, provides extended operational time.

The optimized logic decides when to supply battery power from one battery to the other device, and when to charge one battery from the other, based on the voltages of the two batteries, and based on the operational modes of the two devices.

The present invention applies generically to a wide variety of electronic devices that use single or dual input battery chargers, voltage boosts, and USB chargers to power manage their electrical components. In particular, the present invention applies to a small modular cell phone that is attachable to host devices and to jackets with user interfaces. The modular cell phone provides the host devices with wireless communication functionality, when attached thereto. The jackets provide the modular cell phone with custom keypads, displays, microphone, speakers and other such user interface components. The present invention also applies to a small modular media player that attaches to host devices and provides them with media playing functionality.

There is thus provided in accordance with an embodiment of the present invention a system for bi-directional battery charging, including a first electronic device, including a first rechargeable battery, for providing power to the first electronic device, and a first battery charger, and a second electronic device, including a second rechargeable battery, for providing power to the second electronic device, a second battery charger, a voltage boost that receives an input voltage from the first rechargeable battery and is selectively enabled to either up-convert the input voltage as input to the second battery charger, or else to passively pass the input voltage to the second battery charger; and a controller for programmatically controlling the first and the second battery chargers and the voltage boost, wherein the second electronic device attaches to the first electronic device to operate in combination therewith, and wherein the controller is programmed to decide, based on the voltages of the first and the second rechargeable batteries: (i) whether to supply power to the second electronic device from the first or second rechargeable battery, (ii) whether to charge the second rechargeable battery from the first rechargeable battery, and (iii) whether to enable or disable the voltage boost.

There is further provided in accordance with an embodiment of the present invention a system for bi-directional battery charging, including a first electronic device, including a first rechargeable battery, for providing power to the first electronic device, a first battery charger, a first voltage boost for receiving an input voltage is selectively enabled to either up-convert the input voltage as input to the first battery charger, or else to block the input voltage from being transferred to the first battery charger, and a second electronic device, including a second rechargeable battery, for providing power to the second electronic device and for providing the input voltage to the first voltage boost, a second battery charger, a second voltage boost that receives an input voltage from the first rechargeable battery and is selectively enabled to either up-convert the input voltage as input to the second battery charger, or else to passively pass the input voltage to the second battery charger, and a controller for programmatically controlling the first and the second battery chargers and the first and second voltage boosts, wherein the second electronic device attaches to the first electronic device to operate in combination therewith, and wherein the controller is programmed to decide, based on the voltages of the first and the second rechargeable batteries: (i) whether to supply power to the second electronic device from the first or second rechargeable battery, (ii) whether to charge the first or second rechargeable battery from the other rechargeable battery, and (iii) whether to enable or disable the first and second voltage boosts.

There is yet further provided in accordance with an embodiment of the present invention a method for controlling battery power supply and battery charging for two coupled electronic devices, each device having its own rechargeable battery and its own internal battery charger, including determining battery voltages for each of the two electronic devices, determining operational modes for each of the two electronic devices, and based on the determining battery voltages and the determining operational modes, controlling the batteries and battery chargers including deciding (i) whether to supply power to each electronic device from its own battery or from the other device's battery, and (ii) whether to charge one battery from the other battery.

There is additionally provided in accordance with an embodiment of the present invention a system for bi-directional battery charging, including two coupled electronic devices, each device comprising a rechargeable battery and an internal battery charger, wherein the rechargeable battery of each device is able to supply power to both devices, and wherein the rechargeable battery of each device is able to charge the other device's rechargeable battery.

BRIEF DESCRIPTION OF THE DRAWINGS

The present invention will be more fully understood and appreciated from the following detailed description, taken in conjunction with the drawings in which:

FIG. 3 is an illustration of a jacket for a modular cell phone, in accordance with an embodiment of the present invention;

FIG. 10 is a summary of bi-directional battery charging logic for the hardware of FIG. 9, in accordance with an embodiment of the present invention;

FIG. 12 is a summary of bi-directional battery charging logic for the hardware of FIG. 11, in accordance with an embodiment of the present invention.

DETAILED DESCRIPTION

Aspects of the present invention relate to a small modular cell phone that connects to other devices and enables the other devices to communicate wirelessly. The modular cell phone of the present invention operates both in standalone mode as a standalone phone, and also in conjunction with devices to which it is connected.

There are two general types of devices into which the modular cell phone may be connected; namely, jackets and hosts. A jacket is a device that provides a user interface for the modular cell phone, and does not operate independently, when not connected to the modular cell phone. A jacket is a device that enriches the capabilities of the modular cell phone, and is not able to operate independently when it is not connected to the modular cell phone. Conversely, a host is a device that is able to operate independently when it is not connected to the modular cell phone, and whose capabilities are enriched by the modular cell phone when connected thereto.

Figure 1B:
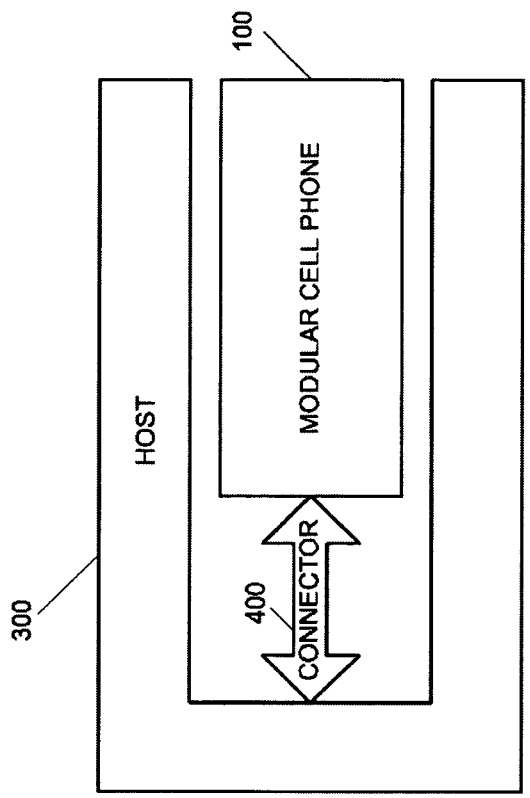
FIG. 1B is a simplified block diagram of a modular cell phone connected to a host, in accordance with an embodiment of the present invention
Figure 1A:
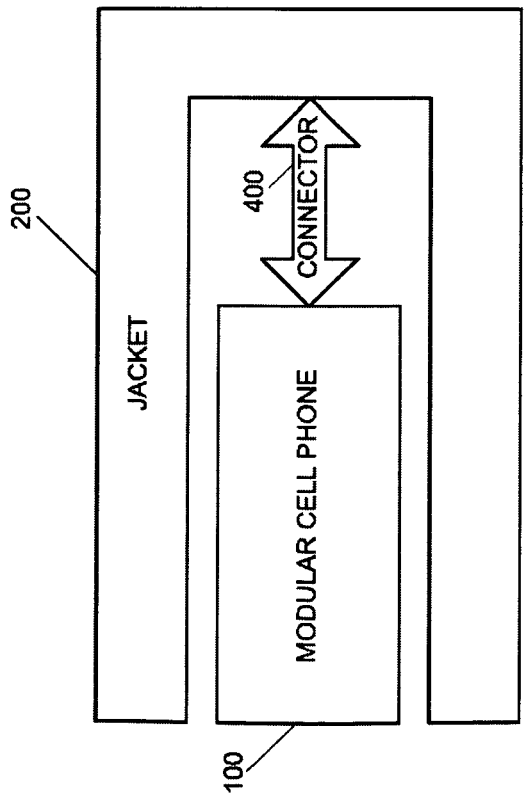
FIG. 1A is a simplified block diagram of a modular cell phone connected to a jacket, in accordance with an embodiment of the present invention.

Reference is now made to FIG. 1A, which is a simplified block diagram of a modular cell phone 100 connected to a jacket 200, in accordance with an embodiment of the present invention. Generally, modular cell phone 100 is inserted inside jacket 200, and connects therewith by means of a dedicated connector 400.

Reference is now made to FIG. 1B, which is a simplified block diagram of modular cell phone 100 connected to a host 300, in accordance with an embodiment of the present invention. Modular cell phone 100 may be attached to host 300 or inserted therewithin, and connects therewith by means of a dedicated connector 400. Although FIGS. 1A and 1B appear similar at this low level of detail, higher levels of detail in FIGS. 2-8 distinguish between jackets and hosts.

Figure 2:
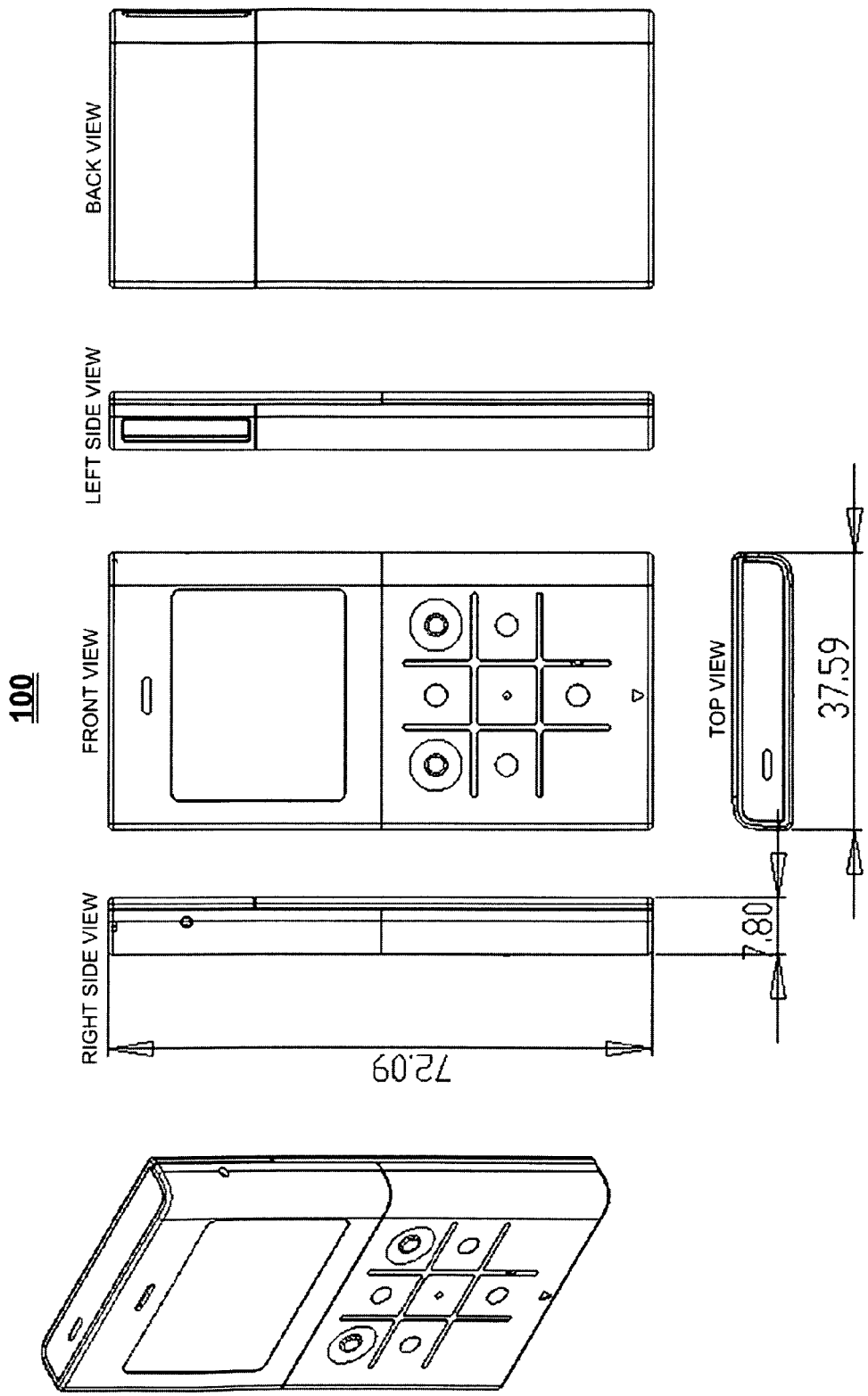
FIG. 2 is a mechanical drawing with cross-sectional views of a modular cell phone, in accordance with an embodiment of the present invention.

Reference is now made to FIG. 2, which is a mechanical drawing with cross-sectional views of modular cell phone 100, in accordance with an embodiment of the present invention. Shown in FIG. 2 are front, back, left side, right side and top views of modular cell phone 100. The dimensions of modular cell phone 100 are 72.09 mm×37.59 mm×7.80 mm. It will be appreciated by those skilled in the art that the present invention is applicable when modular cell phone 100 is designed with other dimensions, as well.

Reference is now made to FIG. 3, which is an illustration of jacket 200 for a modular cell phone, in accordance with an embodiment of the present invention. Jacket 200 shown in FIG. 3 includes a user interface for an audio/video player. Specifically, jacket 200 includes a USB connector 240, a keypad 250, a display 255, a microphone 260 (shown in FIG. 7), speakers 265, speaker amplifier 275 (shown in FIG. 7), an earpiece 285, an earpiece amplifier 290 (shown in FIG. 7) and a headset audio jack 295.

It will be appreciated by those skilled in the art that the components of jacket 200 in FIG. 3 are illustrative of one jacket design, and that the present invention is applicable to a wide variety of jacket designs.

Figure 4:
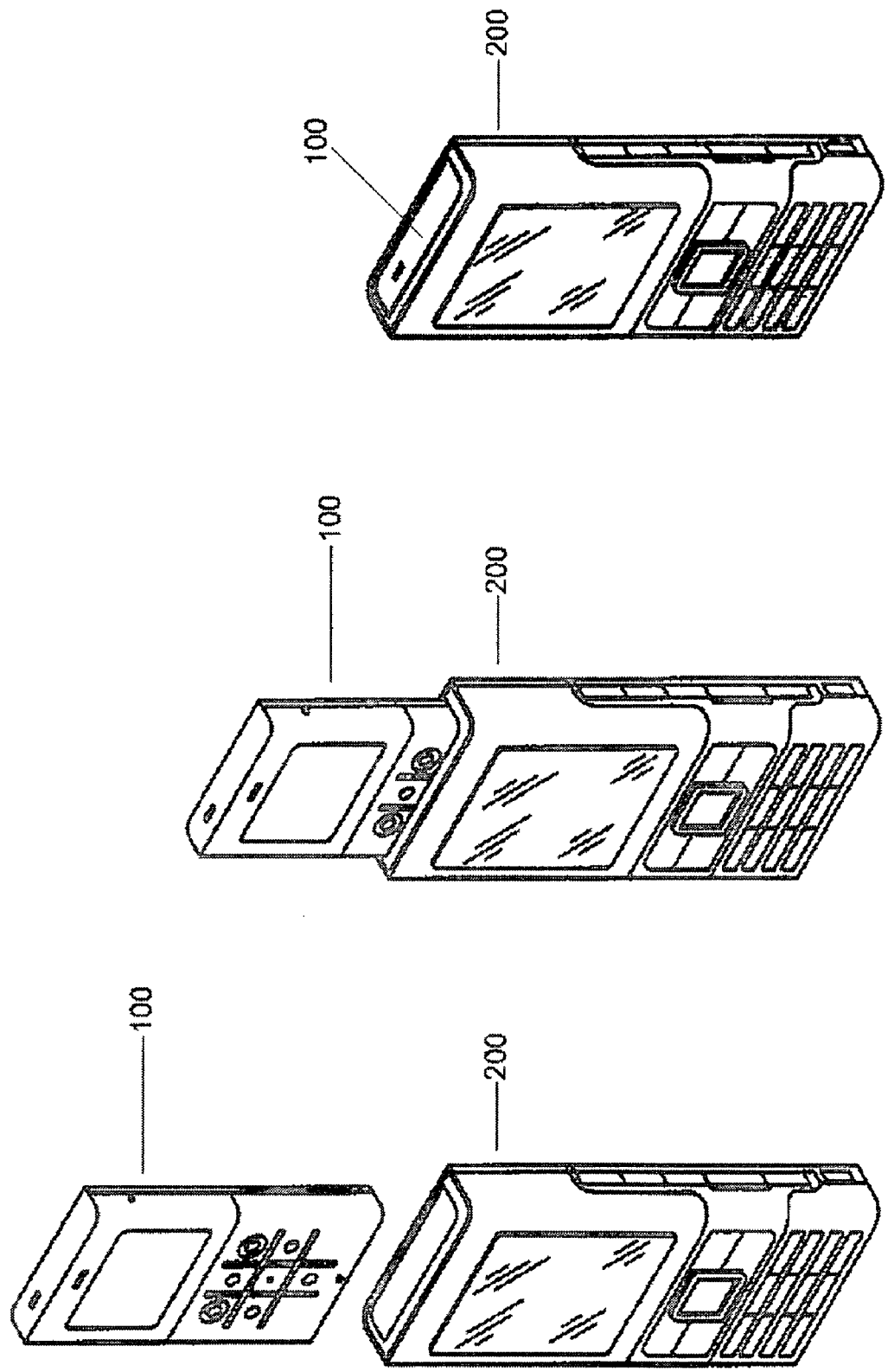
FIG. 4 is an illustration of a modular cell phone being inserted into a jacket, in accordance with an embodiment of the present invention.

Reference is now made to FIG. 4, which is an illustration of modular cell phone 100 being inserted into jacket 200, in accordance with an embodiment of the present invention.

Figure 5:
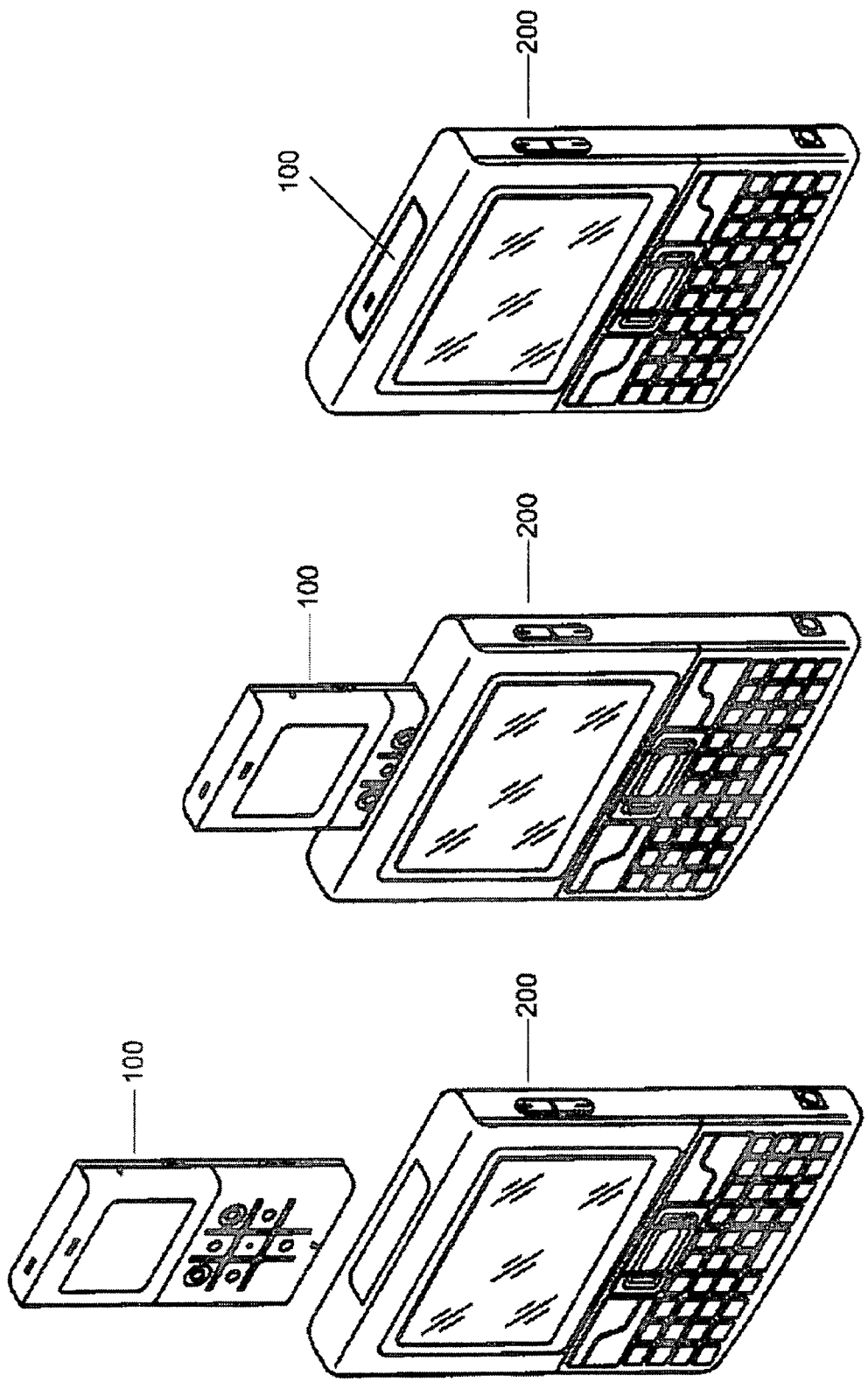
FIG. 5 is an illustration of a modular cell phone being inserted into a host device, in accordance with an embodiment of the present invention.

Reference is now made to FIG. 5, which is an illustration of a modular cell phone 100 being inserted into host device 300, in accordance with an embodiment of the present invention.

Figure 6:
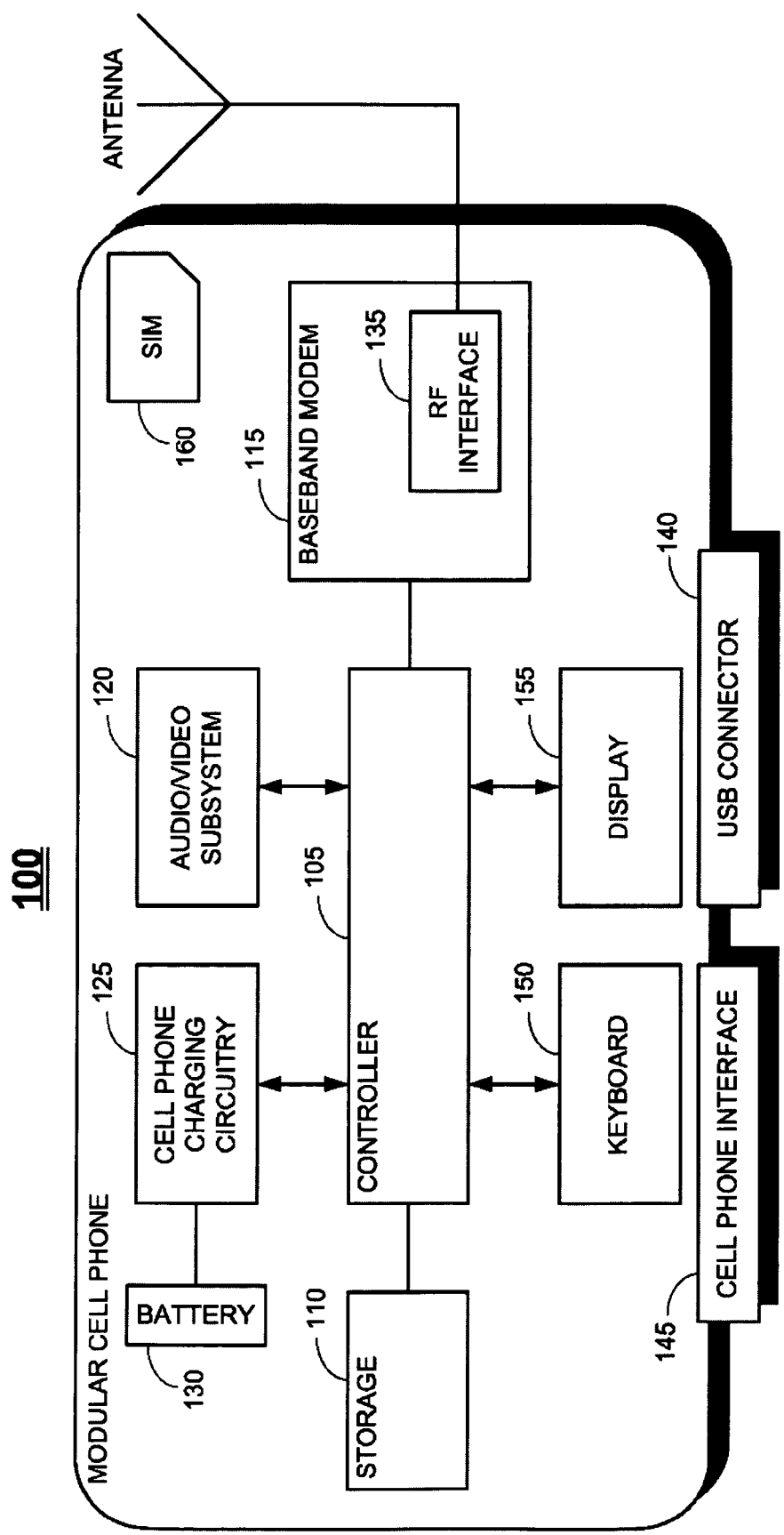
FIG. 6 is a simplified block component diagram of a modular cell phone, in accordance with an embodiment of the present invention.

Reference is now made to FIG. 6, which is a simplified block component diagram of modular cell phone 100, in accordance with an embodiment of the present invention. Modular cell phone 100 includes five primary components, as follows: an ASIC controller 105, a memory storage 110, a baseband modem 115 for sending and receiving voice communications, an audio/video subsystem 120, and cell phone charging circuitry 125 for a battery 130.

ASIC controller 105 executes programmed instructions that control operation of mobile communication device 100. Baseband modem 115 includes a radio frequency (RF) interface 135 that is connected to an antenna.

Audio/video subsystem 120 includes a voice, audio and video interface. Cell phone charging circuitry 125 includes a power management integrated circuit. In accordance with an embodiment of the present invention, cell phone charging circuitry 125 supports fixed current and fixed voltage operational modes, and is capable of measuring voltage and current. Cell phone charging circuitry 125 is controlled by controller 105.

Modular cell phone 100 includes a USB interface 140 and an interface 145 for connector 400. Modular cell phone 100 optionally includes a keyboard 150, a display 155 and a SIM card 160.

Modular cell phone 100 can be operated in standalone mode, or in conjunction with jacket 200 or host 300 when it is attached thereto.

Figure 7:
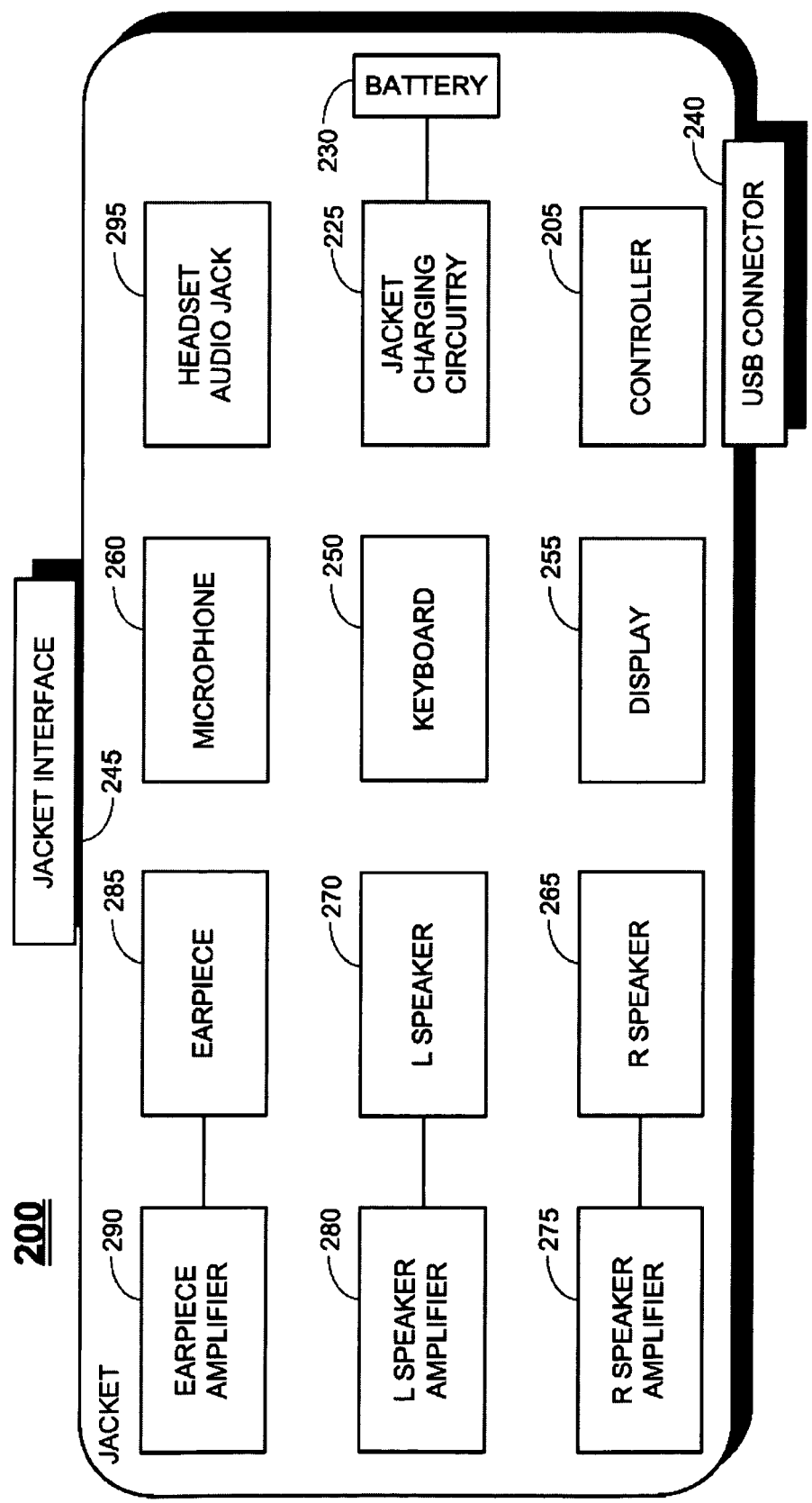
FIG. 7 is a simplified block component diagram of a jacket for a modular cell phone, in accordance with an embodiment of the present invention.

Reference is now made to FIG. 7, which is a simplified block component diagram of jacket 200 for modular cell phone 100, in accordance with an embodiment of the present invention. Jacket 200 includes a controller 205, jacket charging circuitry 225 and battery 230, and a USB connector 240. Jacket charging circuitry 225 supports both a fixed voltage mode and a fixed current mode. Jacket charging circuitry 225 independently controls internal current and voltage of jacket 200.

Jacket 200 provides a variety of user interface components for modular cell phone 100, including keyboard 250, display 255, microphone 260, respective left and right speakers and left and right speaker amplifiers 265, 270, 275 and 280, earpiece 285 and earpiece amplifier 290 and headset audio jack 295.

Jacket 200 supports audio and USB signals being routed to jacket headset port 295, jacket earpiece 285, one or two jacket speakers 265 and 270, and jacket USB connector 240. Jacket 200 supports stereo amplifiers 275 and 280, with high impedance inputs and outputs for driving 8Ω speakers 265 and 270. The circuitry in jacket 200 also supports earpiece amplifier 290, with a high impedance input and output capable of driving 32Ω speaker 285. Jacket 200 includes an external interface 245 for connecting jacket 200 to modular cell phone 100 via connector 400.

Figure 8:
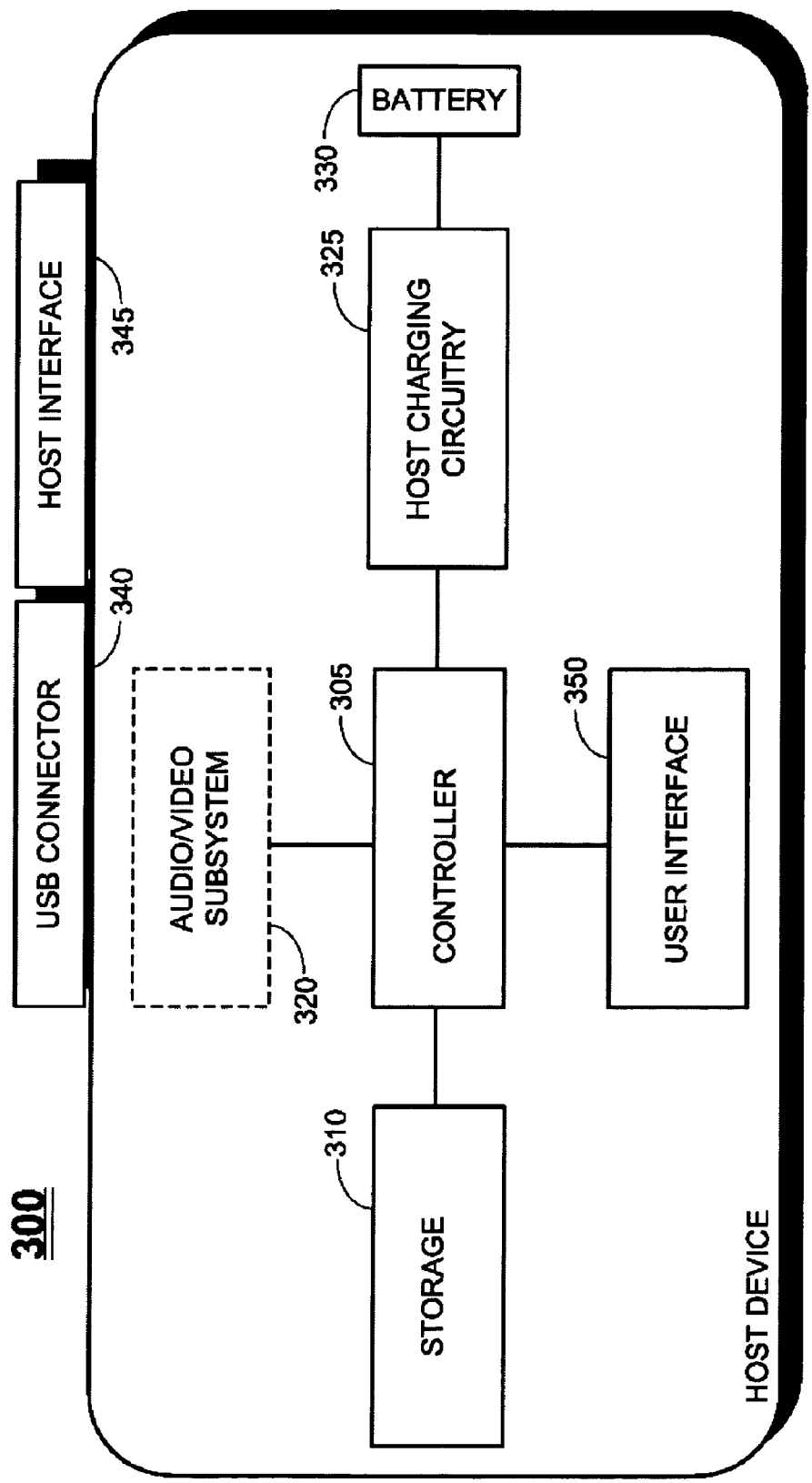
FIG. 8 is a simplified block component diagram of a host device that interoperates with a modular cell phone, in accordance with an embodiment of the present invention.

Reference is now made to FIG. 8, which is a simplified block component diagram of host device 300 that interoperates with modular cell phone 100, in accordance with an embodiment of the present invention. Host device 300 includes four interconnected primary components; namely, a controller 305, a storage unit 310, host charging circuitry 325 for a battery 330, and a USB interface 340. Host device 300 includes an optional audio/video subsystem 320.

Host device 300 also includes a user interface 350. User interface 350 may include some of all of the voice, audio and video interfaces shown in FIG. 7 with reference to jacket 200. Host device 300 includes an external interface 345 for connecting host device 300 to modular cell phone 100 via connector 400.

Figure 9:
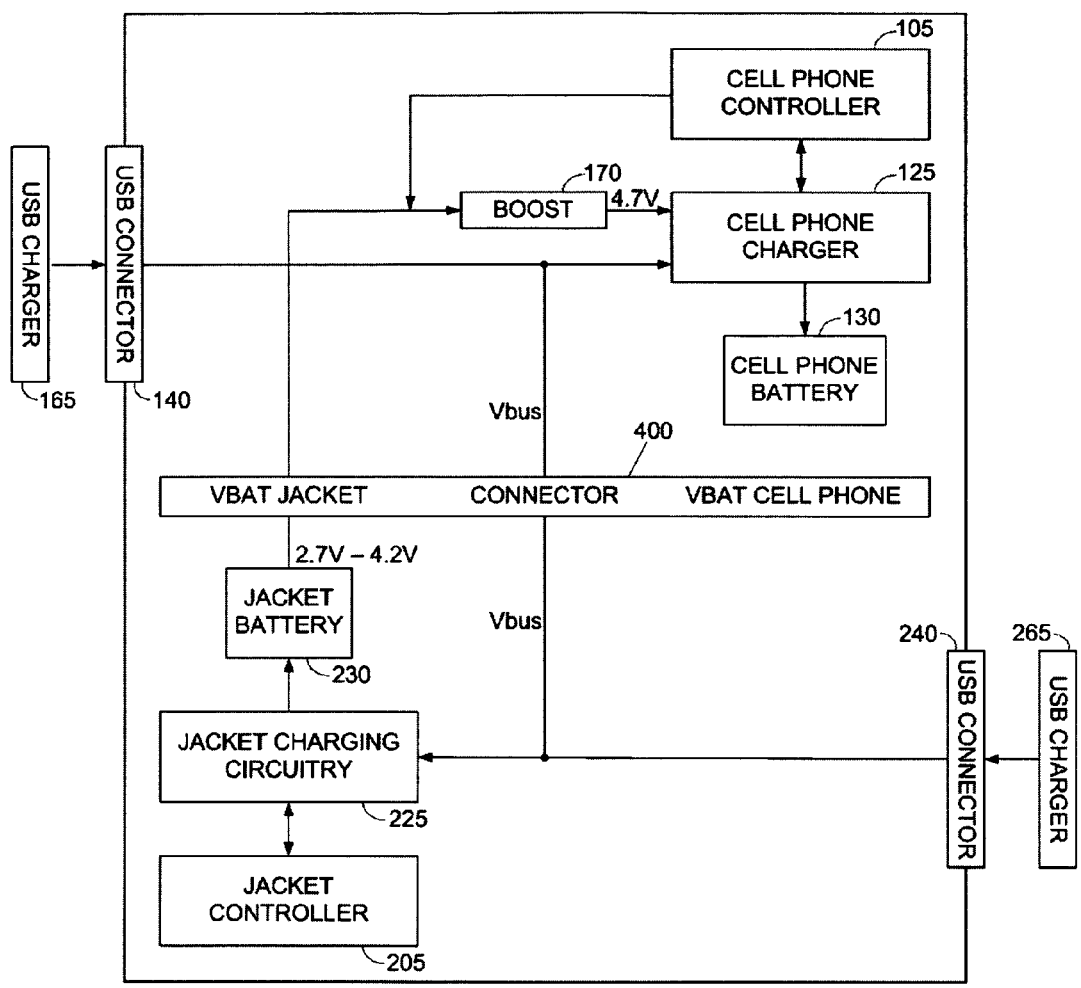
FIG. 9 is a simplified block diagram of bi-directional battery charging for a jacket or a simple host device, in accordance with an embodiment of the present invention.

Reference is now made to FIG. 9, which is a simplified block diagram of bi-directional battery charging for a jacket or a simple host device, in accordance with an embodiment of the present invention. Shown in FIG. 9 are cell phone controller 105, cell phone charging circuitry 125 and cell phone battery 130 from FIG. 6. Cell phone charging circuitry 125 has a dual input. A first input is connected to USB connector 140 for a USB charger 165, and a second input is connected to the output of a voltage boost 170.

Also shown in FIG. 9 are jacket controller 205, jacket charging circuitry 225, and jacket battery 230. Jacket charging circuitry 225 is a single input charger, with its input connected to USB connector 240 for a USB charger 265.

Connector 400 provides signal paths between components of cell phone 100 and components of jacket 200. Via connector 400, the input of USB charger 265, denoted by Vbus in FIG. 9, is routed to USB charger 165.

Controller 105 is able to track the voltage on battery 230, either by directly measuring a battery pin on connector 400, or by receiving notifications from jacket charging circuitry 225 via connector 400.

Voltage boost 170 receives a standard battery voltage as input and generates as output a minimal charging voltage of cell phone charging circuitry 125. Typical input to boost 170 is in the range 2.7V-4.2V, and typical output is 4.7V. When enabled, boost 170 up-converts its input voltage. When disabled, boost 170 simply passes its input voltage through to its output, minus any internal voltage drop. Boost 170 is enabled by controller 105 via an enable signal. The input of boost 170 is connected to a pin of connecter 400, such that when attached to jacket 200, boost 170 has a direct connection to battery 230.

The system of FIG. 9 applies advantageously to simple devices 200, which have limited power consumption, lower than a threshold current, typically 500 mA. In such case, battery 130 supplies current to the electronic components of device 200 through connector 400.

It will be appreciated by those skilled in the art that the bi-directional battery charging diagram in FIG. 9 applies to a general setting whereby a mobile device can be docked to an accessory device. For the sake of clarity, the above disclosure has been presented for a cell phone that attaches to a jacket. However, the present invention may be used advantageously for bi-directional battery charging for general electronic devices that include controllers, rechargeable batteries, boosts and battery chargers as shown in FIG. 9. To this end, the logic provided in FIG. 10 hereinbelow is disclosed in terms of a mobile standalone device and a docked device, to address the general setting.

Reference is now made to FIG. 10, which is a summary of bi-directional battery charging logic for the hardware of FIG. 9, in accordance with an embodiment of the present invention. For purposes of generality, in the notation of FIG. 10 cell phone 100 is referred to as a standalone (SA) device, and jacket 200 is referred to as a jacket (JKT), into which the SA device can be docked.

FIG. 10 is divided into six columns. The first column refers to a state of the SA battery, and the second column refers to a state of the jacket battery. Referring to FIG. 9, the following notation is used in these two columns.

CC is the charging current for the SA battery. CC should conform to the maximal charging current authorization set by the JKT, and is typically between 200 mA-500 mA. For example, if the SA battery has a charge of 500 mAh, charging with a current greater than 500 mA may be harmful to the battery.

JKT is the voltage of the JKT battery.

SA is the voltage of the SA battery.

STBC is the average standby current of the SA device. STBC is typically between 5 mA-50 mA.

Vc is the voltage drop across the SA boost, the SA battery charger and the SA battery, when being charged with charge CC. Vc is typically approximately 0.3V and corresponds to 50%-100% of the SA battery capacity.

Vh is the maximal voltage to which the SA battery is charged when being charged from the JKT battery. Vh is typically between 3.7V-4V corresponding to approximately 50% capacity of the SA battery.

Vl is the minimal voltage for the SA battery, below which charging from the JKT is forced. Vl is typically between 3.4V-3.5V corresponding to approximately 10% capacity of the SA battery.

Vm is the minimal voltage for the JKT battery, below which charging from the SA device is forced. Vm is typically between 3.4V-3.5V corresponding to approximately 10% capacity of the JKT battery.

The third column in FIG. 10 refers to the mode in which the SA device is operating. There are three operational modes for the SA device, as follows:

I. High Current Consumption. This mode occurs when the SA device is active and transmitting between the SA device and a base transceiver station (BTS). In this mode the SA has a typical current consumption greater than 100 mA, with peak currents possibly greater than 1 A, depending on power requirement factors, such as the distance of the SA device from the BTS. Using the JKT battery to supply the SA device is undesirable in this mode, due to the high peak currents. Transfer of such high current over connectors poses difficult requirements on the quality and current drive of the JKT battery, boost current and charger current, resulting in increased cost and size of the hardware. Charging in this mode is limited to fixed current, since fixed voltage charging draws peak currents from the JKT, which is undesirable.

II. Standby Current Consumption. This mode occurs when the SA device is not communicating with the BTS. In this mode the SA device has an typical current consumption less than 100 mA, and no peak currents above 100 mA. Such current levels are suitable for supply from the JKT battery, and do not impose limitations on charging.

III. Shutdown. In this mode the SA device is shut down and has negligible current consumption.

The fourth column in FIG. 10 refers to the mode of charging the batteries. There are five charging modes, as follows:

I. No Charge. The SA battery supplies all SA current. Efficiency is high, since no extra conversion is applied. The SA battery is being depleted during this mode.
II. Supply from JKT Battery. In this mode, the JKT battery supplies current. Efficiency is lower than in the No Charge mode, due to voltage drop on the SA boost and SA charger, but in general this mode is efficient and preserves power of the SA battery for standalone operation of the SA device.
III. Supply from SA and JKT Battery. In this mode, when there are peaks, the current is drawn from both the SA and the JKT battery. When there are not peaks, the current is drawn from the JKT battery alone. Current peaks are prevalent in many wireless communication systems, including inter alia Global System for Mobile Communication (GSM), General Packet Radio System (GPRS), Code Division Multiple-Access (CDMA), and Integrated Digital Enhanced Network (IDEN). For the GSM system, peaks occur due to time division multiplexing and are caused by time slots usage.
IV. Charge from JKT Battery. In this mode the JKT battery charges the SA battery. This mode is inefficient, in some circumstances possibly less than 500% efficiency. If the SA boost is enabled, the efficiency is even lower, by approximately 100%. When the JKT battery is empty, charging from the JKT battery is disabled.
V. Charge from SA Battery. In this mode the SA battery charges the JKT battery. This mode is inefficient, in some circumstances possibly less than 50% efficiency. If the JKT boost is enabled, the efficiency is even lower, by approximately 100%.

The fifth column in FIG. 10 refers to enablement of disablement or the SA boost. The sixth column in FIG. 10 refers to the SA charger.

The logic in FIG. 10 is implemented as programming logic for SA and JKT battery chargers and SA boost, to optimize their operation. The logic in FIG. 10 prescribes columns 4-6 (charging mode, SA boost enablement and SA charger) in terms of columns 1-3 (SA battery voltage, JKT battery voltage and SA operational mode). For example, referring to the first two rows in FIG. 10, if JKT>SA>Vh and if the SA device is in Standby Current Consumption mode, then the charging mode is set for the JKT battery to supply current to the SA device, the SA boost is disabled, and the SA charger is set to fixed voltage level. If instead the SA device is in High Current Consumption mode, then the charging mode is set for both the SA and JKT battery to supply current to the SA device, and the SA charger is set to fixed current level. The logic in FIG. 10 optimizes usage of the SA and JKT batteries, in order to provide extended operation time for the SA device in combination with the JKT, and in standalone mode; and in order to facilitate charging the SA battery from JKT.

Figure 11:
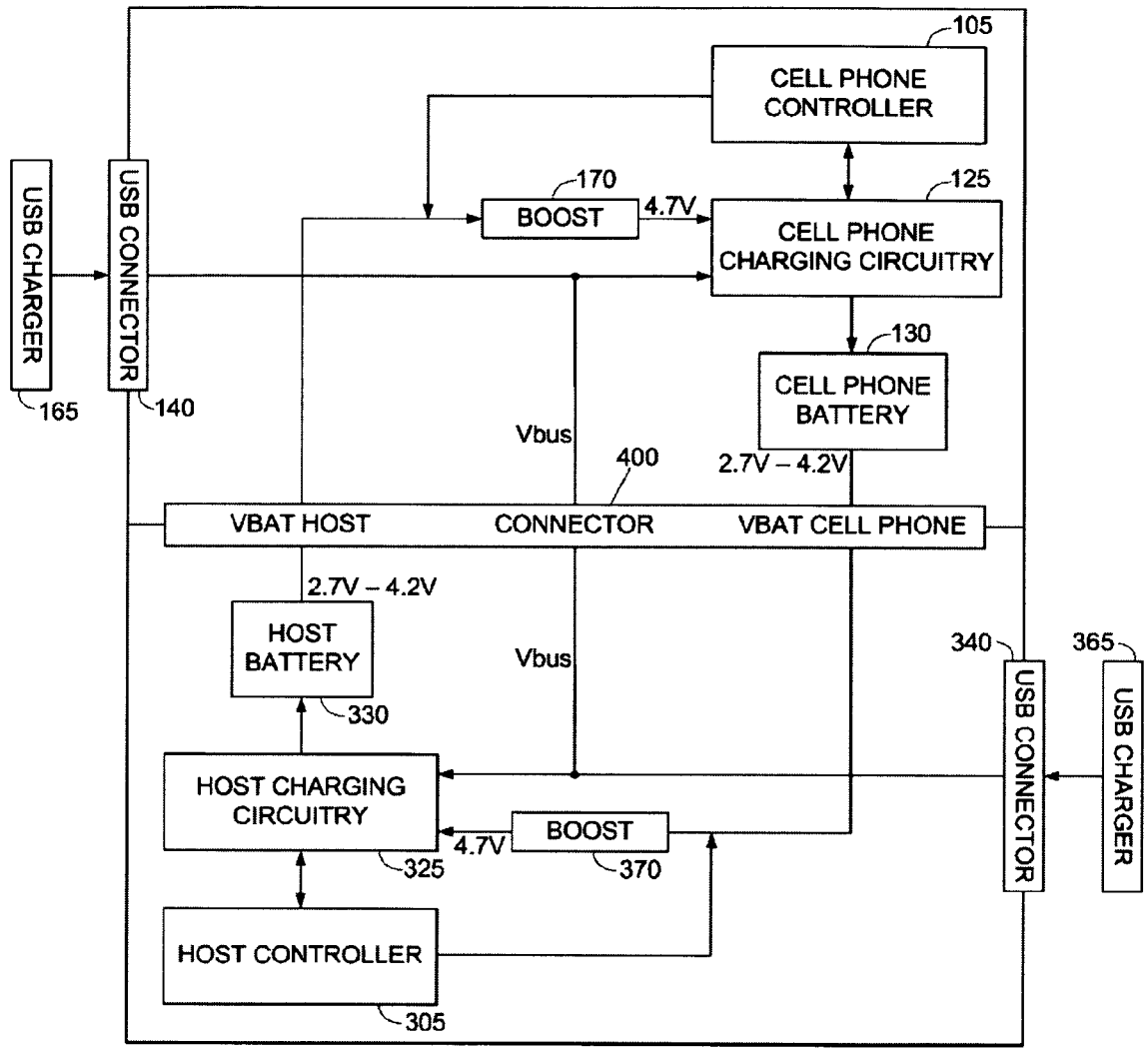
FIG. 11 is a simplified block diagram of bi-directional battery charging for a complex host device, in accordance with an embodiment of the present invention.

Reference is now made to FIG. 11, which is a simplified block diagram of bi-directional battery charging for a complex host device, in accordance with an embodiment of the present invention. Shown in FIG. 11 are cell phone controller 105, cell phone charging circuitry 125 and cell phone battery 130 from FIG. 6. Cell phone charging circuitry 125 has a dual input. A first input is connected to USB connector 140 for a USB charger 165, and a second input is connected to the output of a voltage boost 170.

Also shown in FIG. 11 are controller 305, host charging circuitry 325, and host battery 330. Host charging circuitry 325 has a dual input. A first input is connected to USB connector 340 for a USB charger 365, and a second input is connected to the output of a voltage boost 370. Host charging circuitry 325 is a hardware-based charging controller that controls charging, including constant current charging and constant voltage charging, based on its input voltage levels and its output HST battery status.

Connector 400 provides signal paths between components of cell phone 100 and components of host 300. Via connector 400, the input of USB charger 365, denoted by Vbus in FIG. 11, is routed to USB charger 165.

Controller 105 is able to track the voltage on battery 330, either by directly measuring a battery pin on connector 400, or by receiving notifications from host charging circuitry 325 via connector 400.

Voltage boosts 170 and 370 receive standard battery voltage as input and generate as output a minimal charging voltage of cell phone charging circuitry 125 and host charging circuitry 325, respectively. Typical inputs to boosts 170 and 370 are in the range 2.7V-4.2V, and typical outputs are 4.7V.

When enabled, boosts 170 and 370 up-convert their input voltages. When disabled, boost 170 simply passes its input voltage through to its output, minus any internal voltage drops. When disabled, boost 370 blocks its input voltage from going out as output.

In an alternative embodiment of the present invention, host controller 305 enables and disables host charging circuitry 325, and boost 370 operates similarly to boost 170; namely, when disabled, boost 370 passes its input voltage through to its output, minus any internal voltage drops.

Boost 170 is enabled by controller 105 via an enable signal. The input of boost 170 is connected to a pin of connecter 400, such that when attached to host 300, boost 170 has a direct connection to battery 330. Similarly, boost 370 is enabled by controller 305 via an enable signal. The input of boost 370 is connected to a pin of connector 400, such that when attached to cell phone 100, boost 370 has a direct connection to battery 130.

In yet another alternate embodiment of the present invention, host controller 305 enables and disables host charging circuitry 325, and boost 370 is eliminated. Instead of enabling and disabling a voltage boost, controller 305 enables host charging circuitry 325 when charging is desired, and disables host charging circuitry 325 when charging is not desired.

The system of FIG. 11 applies advantageously to complex devices 300, which have current consuming components above a threshold current, typically 500 mA. For such devices, it is impractical to supply their current from battery 130. Such current would require too much draw from battery 130, and would be too high for transfer over connector 400. Instead, battery 330 supplies current for the components of device 300.

As mentioned above with reference to FIG. 9, it will be appreciated by those skilled in the art that the bi-directional battery charging diagram in FIG. 11 applies to a general setting whereby a mobile device can be docked to an accessory device. For the sake of clarity, the above disclosure has been presented for a cell phone that attaches to a host. However, the present invention may be used advantageously for bi-directional battery charging for general electronic devices that include controllers, rechargeable batteries, boosts and battery chargers as shown in FIG. 11. To this end, the logic provided in FIG. 12 hereinbelow is disclosed in terms of a mobile standalone device and a docked device, to address the general setting.

Reference is now made to FIG. 12, which is a summary of bi-directional battery charging logic for the hardware of FIG. 11, in accordance with an embodiment of the present invention. As with FIG. 10, for purposes of generality, in the notation of FIG. 12 cell phone 100 is referred to as a standalone (SA) device, and host 300 is referred to as a host (HST)

device, into which the SA device can be docked. The notation indicated above for FIG. 10 applies to FIG. 12 as well, with HST being used for the docking device instead of JKT.

The logic in FIG. 12 is implemented as programming logic for SA and HST battery chargers to optimize their operation. FIG. 12 uses the same six columns as FIG. 10, with an additional column for indicating enablement/disablement of the HST charger and boost. The logic in FIG. 12 prescribes the settings in columns 4-7 (charging mode, SA boost enablement, SA charger, HST charger and boost) based on the states in columns 1-3 (SA battery voltage, HST battery voltage and SA operational mode). For example, referring to the first two rows in FIG. 12, if HST>SA>Vh and if the SA device is in Standby Current Consumption mode, then the charging mode is set for the HST battery to supply current to the SA device, the SA boost is disabled, the SA charger is set to fixed voltage level, and the HST charger and boost are disabled. If instead the SA device is in High Current Consumption mode, then the charging mode is set for both the SA and HST battery to supply current to the SA device, and the SA charger is set to fixed current level. The logic in FIG. 12 optimizes usage of the SA and HST batteries, in order to provide extended operation time for the SA device in combination with the HST, and in standalone mode; and in order to facilitate charging the SA battery from the HST.

It will be appreciated by those skilled in the art that the distinction of JKT vs HST in the systems of FIGS. 9 and 11 and in the logic of FIGS. 10 and 12 is merely for the purpose of clarity of exposition. The system and logic of FIGS. 9 and 10 also apply to simple host devices 300, in addition to jackets 200; and the system and logic of FIGS. 11 and 12 also apply to complex jackets 200, in addition to host devices 300. In general, the system and logic of FIGS. 9 and 10 apply to devices (jackets or hosts) with limited power consumption; e.g., less than 500 mA; and the system and logic of FIGS. 11 and 12 apply to devices (jackets or hosts) with higher current consumption.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A system for bi-directional battery charging, comprising:
   a first electronic device, comprising:
      a first rechargeable battery, for providing power to the first electronic device; and
      a first battery charger; and
   a second electronic device, comprising:
      a second rechargeable battery, for providing power to the second electronic device;
      a second battery charger;
      a voltage boost that receives an input voltage from said first rechargeable battery and is selectively enabled to either up-convert the input voltage as input to said second battery charger, or else to pass the input voltage through unchanged to said second battery charger; and
      a controller for programmatically controlling said first and said second battery chargers and said voltage boost, wherein said second electronic device attaches to said first electronic device to operate in combination therewith, and wherein said controller is programmed to decide, based on the voltages of said first and said second rechargeable batteries: (i) whether to supply power to said second electronic device from said first or second rechargeable battery, (ii) whether to charge said second rechargeable battery from said first rechargeable battery, and (iii) whether to enable or disable said voltage boost.

2. The system of claim 1 wherein said second battery charger operates in a fixed current and a fixed voltage mode, and wherein said controller further decides (iv) whether said second battery charger should operate in the fixed current or the fixed voltage mode.

3. The system of claim 2 wherein said second electronic device has a high current consumption operational mode and a standby current consumption operational mode, and wherein said controller bases its decisions (i)-(iv) on the operational mode of said second electronic device.

4. The system of claim 1 wherein said second battery charger is a dual input charger, with one input from said voltage boost and another input from a USB charger.

5. The system of claim 1 wherein said second electronic device comprises a modular cell phone, and said first electronic device comprises a jacket for said modular cell phone.

6. The system of claim 1 wherein said second electronic device comprises a modular media player, and said first electronic device comprises a jacket for said modular media player.

7. A system for bi-directional battery charging, comprising:
   a first electronic device, comprising:
      a first rechargeable battery, for providing power to the first electronic device;
      a first battery charger;
      a first voltage boost for receiving an input voltage is selectively enabled to either up-convert the input voltage as input to said first battery charger, or else to block the input voltage from being transferred to said first battery charger; and
   a second electronic device, comprising:
      a second rechargeable battery, for providing power to the second electronic device and for providing the input voltage to said first voltage boost;
      a second battery charger;
      a second voltage boost that receives an input voltage from said first rechargeable battery and is selectively enabled to either up-convert the input voltage as input to said second battery charger, or else to pass the input voltage through unchanged to said second battery charger; and
      a controller for programmatically controlling said first and said second battery chargers and said first and second voltage boosts,
   wherein said second electronic device attaches to said first electronic device to operate in combination therewith, and wherein said controller is programmed to decide, based on the voltages of said first and said second rechargeable batteries: (i) whether to supply power to said second electronic device from said first or said second rechargeable battery, (ii) whether to charge said first or second rechargeable battery from the other rechargeable battery, and (iii) whether to enable or disable said first and second voltage boosts.

8. The system of claim 7 wherein said first and second battery chargers operate in a fixed current and a fixed voltage mode, and wherein said controller further decides (iv) whether said first and said second battery chargers should operate in the fixed current or the fixed voltage mode.

9. The system of claim 8 wherein said second electronic device has a high current consumption operational mode and a standby current consumption operational mode, and wherein said controller bases its decisions (i)-(iv) on the operational mode of said second electronic device.

10. The system of claim 7 wherein said second battery charger is a dual input charger, with one input from said voltage boost and another input from a USB charger.

11. The system of claim 7 wherein said second electronic device comprises a modular cell phone, and said first electronic device comprises a host for said modular cell phone.

12. The system of claim 7 wherein said second electronic device comprises a modular media player, and said first electronic device comprises a host for said modular media player.

13. A method for controlling battery power supply and battery charging for two coupled electronic devices, each device having its own rechargeable battery and its own internal battery charger, comprising:

determining battery voltages for each of the two electronic devices;

determining operational modes for each of the two electronic devices; and based on said determining battery voltages and said determining operational modes, controlling the batteries and battery chargers comprising deciding (i) whether to supply power to each electronic device from its own battery or from the other device's battery, (ii) whether to charge one battery from the other battery, and whether to boost a voltage from one battery for input to the other battery's charger.

* * * * *